(12) United States Patent
Tinsley et al.

(10) Patent No.: US 8,768,411 B2
(45) Date of Patent: Jul. 1, 2014

(54) SYSTEMS AND METHODS FOR RF COMMUNICATION BETWEEN PROCESSORS

(75) Inventors: Keith R. Tinsley, Beaverton, OR (US); Scott Chiu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1401 days.

(21) Appl. No.: 11/241,067

(22) Filed: Sep. 30, 2005

(65) Prior Publication Data

US 2007/0207831 A1    Sep. 6, 2007

(51) Int. Cl.
*H04M 1/00*    (2006.01)

(52) U.S. Cl.
USPC .................. 455/556.1; 455/73; 455/550.1

(58) Field of Classification Search
USPC ...................... 455/73, 550.1, 556.1
See application file for complete search history.

(56) References Cited

U.S. PATENT DOCUMENTS

| | | | |
|---|---|---|---|
| 7,088,964 B2 * | 8/2006 | O ................................ | 455/90.3 |
| 7,264,977 B2 * | 9/2007 | Khorram ........................ | 438/15 |
| 2003/0065905 A1 * | 4/2003 | Ishii ............................... | 712/23 |
| 2004/0209648 A1 * | 10/2004 | Chen ............................ | 455/558 |
| 2005/0003606 A1 * | 1/2005 | Tilmans et al. ............... | 438/238 |
| 2005/0138499 A1 * | 6/2005 | Pileggi et al. ................ | 714/724 |

* cited by examiner

*Primary Examiner* — Patrick Edouard
*Assistant Examiner* — Matthew Genack
(74) *Attorney, Agent, or Firm* — Schubert Law Group PLLC

(57) ABSTRACT

Embodiments include systems and methods for integration of RF components onto a single die with functional processing circuitry. For example, one integrated circuit may comprise multiple processors that can communicate there between by way of Radio Frequency (RF) transmission. The processors may also communicate with slave devices by way of radio frequency. Transmission and reception may be at frequencies in a band hitherto unused in computing devices and their peripherals.

23 Claims, 7 Drawing Sheets

SYSTEMS AND METHODS FOR RF COMMUNICATION BETWEEN PROCESSORS

FIELD

The present invention is in the field of multi-processor interconnect communications. More particularly, the invention is in the field of integration, on a single die, of RF receiving and transmitting components with one or more digital processors.

BACKGROUND

"Wireless computing" is a term that has come to describe wireless communications between computing devices. For example, many computers, including tower and laptop models, have a wireless communications card that comprises a transmitter and receiver connected to an antenna. This enables the computer to communicate by Radio Frequency (RF) transmission with a network of computers and peripheral devices. The flexibility and mobility that wireless computing affords is a major reason for its commercial success.

In a wireless environment, principal systems are placed in communication through wireless links. Thus, a transceiver (transmitter and receiver) enables a computer to wirelessly connect to a network of wirelessly-connected computers and peripheral devices such as printers and scanners. However, inside a computer or server or multi-processor system housed as a unit, wire line interconnects are used to connect the different devices within the unit. The wire lines radiate to cause interference. Thus, one set of lines may radiate and induce undesired signals in the other lines. Also, wire lines connecting a plurality of processors and/or slave devices occupy a great deal of area. This reduces the attainable density of circuits connected together by the wire lines.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for integration of RF components onto a single die with functional processing circuitry. For example, one integrated circuit may comprise multiple processors that can communicate there between by way of Radio Frequency (RF) transmission. The processors may also communicate with slave devices by way of radio frequency. Transmission and reception may be at frequencies in a band hitherto unused in computing devices and their peripherals.

Figure 1:
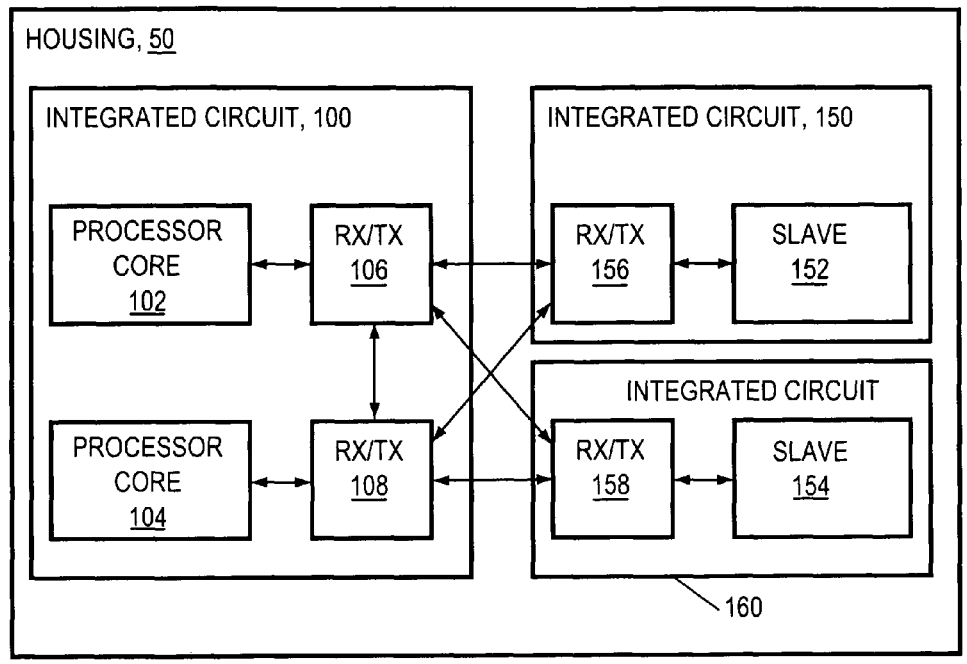
FIG. 1 depicts an embodiment of a multi-transceiver digital processing system.

FIG. 1 shows one embodiment of a close-proximity multi-transceiver system. The system may or may not be fully or partially enclosed in a housing 50. Embodiments contemplate transceivers that are reasonably close to each other so that a direct RF link can be formed there between at high frequencies but yet moderate to relatively low power levels. A first integrated circuit 100 comprises two processor cores 102 and 104 and two transceivers 106 and 108. A processor core may contain a processor, RAM (random access memory), ROM (read-only memory), and processor control circuitry. The processor may typically comprise an instruction fetcher, instruction decoder, instruction buffer, dispatch unit, control circuitry, execution units, and register files. Memory may be organized into a multi-level cache configuration with a small first level cache close to the processor and a larger second level cache somewhat near to the processor.

Processor core 102 is electrically wired to transceiver 106. Processor core 104 is electrically wired to transceiver 108. More specifically, the transceiver circuitry can be integrated with the processor core circuitry to form an integrated circuit comprising a processor core and at least one transceiver on the same die. (In other embodiments described below, more than one transceiver may be electrically wired to one processor core.) Each transceiver 106 and 108 comprises an antenna for transmitting and receiving signals. A signal is modulated before it is transmitted to impress the information content received from the processor core onto a carrier frequency of the modulated signal. A signal received by a transceiver is demodulated to extract the information content of the received modulated signal. In the embodiment of FIG. 1, data can be transferred from processor core 102 to processor core 104 through transceivers 106 and 108. For example, processor core 102 can, by conductive wiring, transfer data to transceiver 106. Transceiver 106 transmits the data by way of RF link (air) to transceiver 108. Transceiver 108 transfers the data by conductive wiring to processor core 104. Thus, bus lines need not be provided between processor cores 102 and 104.

FIG. 1 also shows integrated circuitry 150 and 160. Integrated circuitry 150 or 160 may be on the same die as integrated circuitry 100 or may be on a different die and located in proximity to integrated circuitry 100. Similarly, integrated circuitry 100, 150 and 160 may be on the same printed circuit board or on different printed circuit boards. Integrated circuitry 150 comprises a transceiver 156 and a slave device 152. Integrated circuitry 160 comprises a transceiver 158 and a slave device 154. A slave device can be another processor, a memory controller, a network interface card, etc. In the embodiment of FIG. 1, each transceiver associated with a processor can communicate with either one or both of the transceivers of the slave devices. Thus, bus lines between the processors and the slave devices are not necessary.

A communications protocol may be established between the transceivers 106, 108, 156, and 158. In one embodiment, a transmitter transmits an Identification (ID) number that identifies the intended receiver. Each one of a multiple of receivers compares the received ID number it to its own internally stored ID number to determine if the data is intended for it. In another embodiment, a beam; of a transmitter can be steered to one or more of a plurality of transceivers. Then a transceiver can spatially select its intended transceiver. In yet another embodiment, each transceiver is accorded a time slot in a time division multiplexed signal. Then a transceiver can transmit data to a particular transceiver in one time slot and receive data from the particular transceiver in another time slot. Or the transceiver can transmit and receive in the same time slot, but on different frequencies.

Thus, in one embodiment, one of processor cores 102 and 104 transmits to a receiver data received from the processor core. For example, core 102 may issue a write request to a slave 152 which may be a memory controller and memory. Data to be written is received from core 102 and transmitted by way of RF link to the slave 152. Similarly, data to be read from slave 152 is transmitted by way of RF link to the processor core requesting the data.

Figure 1A:
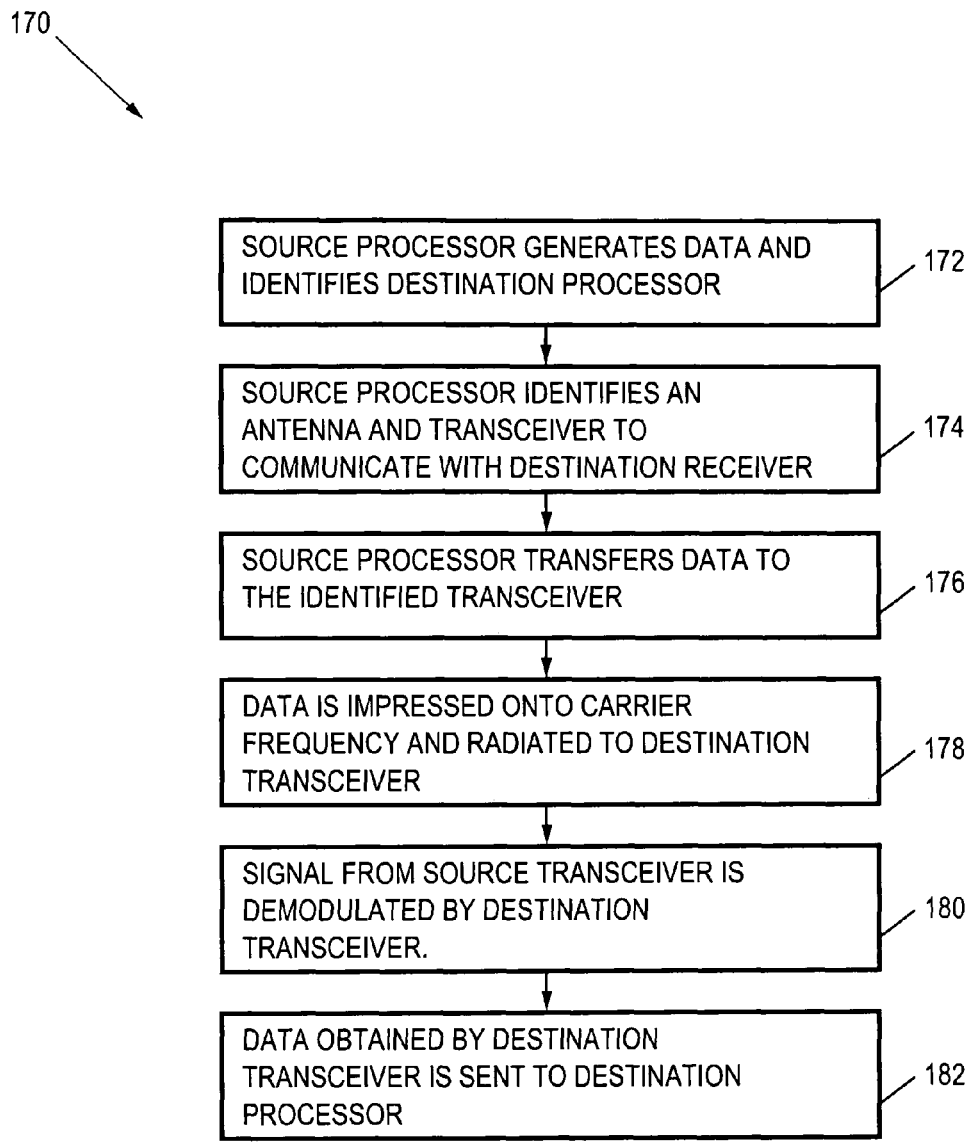
FIG. 1A depicts a flow chart of an embodiment for transmitting data from one processor to another by radio frequency transmission and reception.

FIG. 1A shows a flowchart 170 of an embodiment for transferring data from one processor to another in a wireless system as described herein. In the course of processing, a source processor generates data intended for a destination processor (element 172). The source processor identifies an antenna and transceiver to modulate and radiate the signal (element 174). Thus, for example, if the destination processor is located in an upper right rear octant with respect to the position of the source processor, the source processor selects a transceiver and an antenna to radiate in that octant to communicate the signal to the destination processor. The processor then sends the data to the identified transceiver (element 176). The identified transceiver modulates the data onto a carrier and radiates the data signal to the transceiver of the destination processor (element 178). The destination transceiver demodulates the signal received from the source transceiver (element 180). The data obtained from demodulation by the destination transceiver is sent to the destination processor (element 182).

Figure 2:
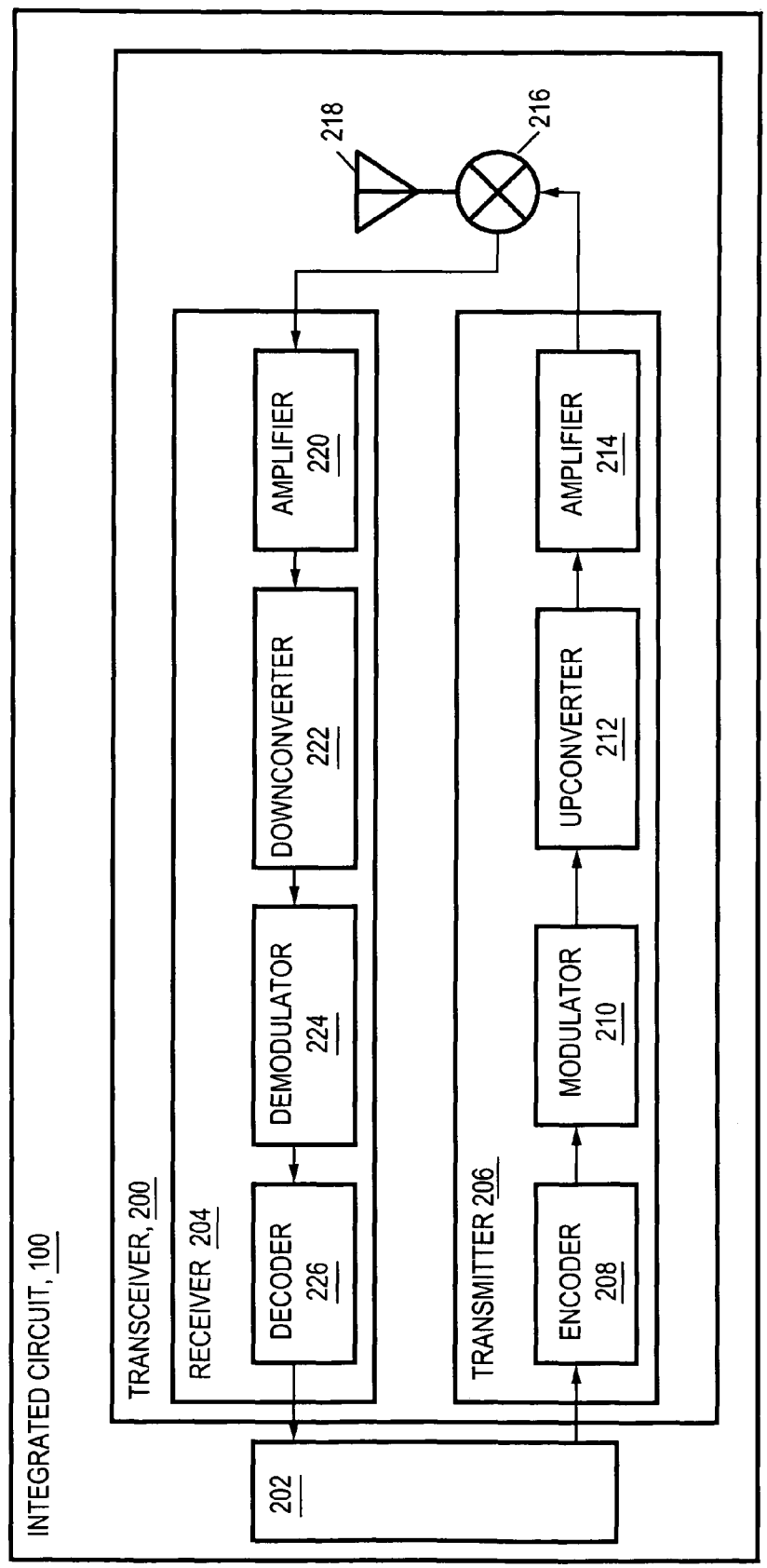
FIG. 2 depicts an embodiment of a transceiver in an integrated circuit that includes a processor.

FIG. 2 shows an embodiment of an integrated circuit 100 comprising a transceiver unit 200 integrated onto the same die as a processor core 202 and related circuitry. Transceiver 200 comprises a receiver 204 and a transmitter 206. An embodiment of a transmitter comprises an encoder 208, a modulator 210, an upconverter 212, and an amplification stage 214. An embodiment of a receiver comprises an amplification stage 220, a downconverter 222, a demodulator 224 and a decoder 226. Each of these components of transceiver 200 and their functions will now be described.

Encoder 208 of transmitter 206 receives data destined for transmission from processor core 202. Processor core may present data to transceiver 200 in blocks such as bytes of data. Encoder 208 encodes the data using any one of a number of algorithms now known or to be developed. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encoding may also comprise encryption for security.

One type of encoding is block encoding. In block encoding, the encoder encodes a block of k information bits into corresponding blocks of n code bits, where n is greater than k. Each block of n bits from the encoder constitutes a code word in a set of $M=2^k$ possible code words. An example of a block encoder that can be implemented is a Reed-Solomon encoder, known by those skilled in the art of encoding. Another type of encoding is linear convolutional encoding. The convolutional encoder may be viewed as a linear finite-state shift register with an output sequence comprising a set of linear combinations of the input sequence. The number of output bits from the shift register for each input bit is a measure of the redundancy in the code. Thus, different embodiments may implement different encoding algorithms.

Modulator 210 of transmitter 206 receives data from encoder 208. A purpose of modulator 210 is to transform each block of binary data received from encoder 208 into a unique continuous-time waveform that can be transmitted by an antenna upon upconversion and amplification. The modulator impresses the received data blocks onto a sinusoid of a selected frequency. More specifically, the modulator maps the data blocks into a corresponding set of discrete amplitudes of the sinusoid, or a set of discrete phases of the sinusoid, or a set of discrete frequency shifts relative to the frequency of the sinusoid. The output of the modulator is a band pass signal that is upconverted to a transmission frequency, amplified, and delivered to an antenna.

In one embodiment, modulator 210 maps a sequence of binary digits into a set of discrete amplitudes of a carrier frequency. This is called Pulse Amplitude Modulation (PAM). Quadrature Pulse Amplitude Modulation (QPAM) is attained by impressing two separate k-bit symbols from the information sequence onto two quadrature carriers $\cos(2\pi f_c t)$ and $\sin(2\pi f_c t)$.

In another embodiment, modulator 210 maps the blocks of data received from encoder 208 into a set of discrete phases of the carrier to produce a Phase-Shift Keyed (PSK) signal. An M-phase PSK signal is generated by mapping blocks of $k=\log_2 M$ binary digits of an input sequence into one of M corresponding phases $\theta=2\pi(m-1)/M$ for m a positive integer less than or equal to M. A resulting equivalent low pass signal may be represented as $$u(t) = \sum_{n=0}^{\infty} e^{j\theta_n} g(t - nT)$$

where g(t−nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 210 maps the blocks of data from an information sequence received from encoder 208 into a set of discrete frequency shifts to produce a Frequency-Shift-Keyed (FSK) signal. A resulting equivalent low pass signal may be represented as:

$$u(t) = \sum_{n=0}^{\infty} \exp(j\pi \Delta f t I_n) g(t - nT)$$

where $I_n$ is an odd integer up to M−1 and $\Delta f$ is a unit of frequency shift. Thus, in an FSK signal, each symbol of an information sequence is mapped into one of M frequency shifts.

Persons of skill in the art will recognize that the mathematical equations discussed herein are exemplary and illustrative, and that different mathematical forms may be used to represent the pertinent signals. Also, other forms of modulation that may be implemented in modulator 210 are known in the art. For example, a combination of Pulse Amplitude Modulation (PAM) and Phase Shift Keying (PSK) can be implemented to produce a PAM-PSK signal. Alternatively, Orthogonal Frequency Division Multiplexing (OFDM) can be implemented. Persons of skill in the art will also recognize that modulation may occur at base band or at an intermediate frequency.

The output of modulator 210 is fed to upconverter 212. A purpose of upconverter 212 is to shift the modulated waveform received from modulator 210 to a much higher frequency. Shifting the signal to a much higher frequency before transmission enables use of an antenna of practical dimensions. That is, the higher the transmission frequency, the smaller the antenna can be. Thus, one may implement an embodiment to operate at a nominal carrier frequency of 60 GHz (Giga-Hertz) or at some frequency within a band of about 30 GHz to about 300 GHz. The required bandwidth of the transmitted signal depends upon the method of modulation. A bandwidth of about 6 Hz (10%) is exemplary. At a transmission frequency of about 60 GHz, a wavelength is about 5 millimeters (mm) so antenna dimensions can be on the order of a few millimeters. This is comparable to circuit wiring dimensions of integrated circuits in CMOS. Thus, a small millimeter wave antenna or an array of antennas can be well integrated with the circuitry of the die. Another advantage of a 60 GHz carrier is that the band is not already used for computer communications.

Upconverter 212 multiplies the modulated waveform by a sinusoid to obtain a signal with a carrier frequency that is the sum of the central frequency of the waveform and the frequency of the sinusoid. The operation is based on the trigonometric identity:

$$\sin A \cos B = \frac{1}{2}[\sin(A + B) + \sin(A - B)]$$

The signal at the sum frequency (A+B) is passed to amplifier 214 and the signal at the difference frequency (A−B) is filtered out. Thus, a band pass filter is provided to ideally filter out all but the information to be transmitted, centered at the carrier (sum) frequency.

The encoded, modulated, upconverted, filtered signal is passed to amplifier 214. In an embodiment, amplifier 214 provides high power amplification to drive the antenna 218. However, the power does not need to be very high to be received by receivers in close proximity to transmitter 206. The distances between transceivers within embodiments of a multi-transceiver system contemplated herein are small. Thus, one may implement a transmitter of moderate or low power output capacity. The required RF transmitter power to effectuate communications within the distances between transceiver units can be met within a CMOS process voltage limitation.

FIG. 2 also shows a diplexer 216 connected to antenna 218. Thus, in this embodiment, a single antenna is used for both transmission and reception. When transmitting, the signal from amplifier 214 passes through diplexer 216 and drives the antenna with the upconverted information-bearing signal. The diplexer prevents the signal from amplifier 214 from entering receiver 204. When receiving, an information bearing signal received by the antenna passes through diplexer 216 to deliver the signal from the antenna to receiver 204. The diplexer then prevents the received signal from entering transmitter 206. Thus, diplexer 216 operates as a switch to alternately connect the antenna to the receiver and the transmitter.

In another embodiment, separate antennas may be used for transmit and receive and a diplexer is not needed. Thus, transmitter 206 would drive a transmitting antenna, and receiver 204 would receive from a separate receiving antenna. When there are separate antennas, transmission and reception can occur simultaneously. In a Frequency Duplex (FD) configuration, transmission occurs at one frequency, while reception occurs at a second frequency. Thus, one transceiver will transmit at frequency $f_a$ and receive at frequency $f_b$, while another transceiver receives at $f_a$ and transmits at $f_b$.

Embodiments may also employ Time Division Multiple Access (TDMA) wherein one time slot is for transmission of information to a first receiver and a next sequential time slot is for transmission of information to a second receiver. In a TDMA configuration, data from a single processor 202 can be multiplexed and transmitted to two different receivers. Similarly, a receiver can receive information during two different time slots from two different transmitters.

A transmit antenna 218 radiates the information bearing signal into a time-varying, spatial distribution of electromagnetic energy that can be received by an antenna of a receiver. The receiver can then extract the information of the received signal. Each antenna may comprise a single antenna element or an array of antenna elements. In one embodiment, antenna 218 is controllably directive to achieve Space Division Multiple Access (SDMA). Thus, a phased array of antenna elements may be steered to direct the central beam of a transmitting antenna to a particular receiver. Similarly, the beam in the radiation pattern of a receive antenna can be steered to a particular transmitter. Further, SDMA may be implemented in conjunction with other multiple access methods. In another embodiment, an antenna provides a fixed beam that "points" in the direction from the transmitter to a particular receiver in proximity thereto. In another embodiment, an antenna provides a fixed split beam that encompasses more than one receiver. The radiation pattern will depend upon the antenna configuration. Thus, a radiation pattern of an antenna may be somewhat omni-directional or highly directive or moderately directive.

Antennas 218 can easily be implemented using existing printed circuit board metallization technology. Microstrips, striplines, slotlines, patches, and notches, for example, are all candidates for antennas 218. As noted, at a frequency of about 60 GHz, printed circuit board antenna elements can be small, on the order of a few millimeters. Thus, an array of antenna elements can be integrated on a single die with the other circuitry. Or an array of antenna elements may be printed on a printed circuit board and receive the modulated signal from transceiver circuitry integrated onto the die with the processor circuitry. Thus, a chip with a processor and receiver integrated thereon may have pin-outs to antenna elements printed on the same circuit board that holds the chip.

FIG. 2 shows an embodiment of a receiver 204 for receiving, demodulating, and decoding an information bearing signal. The signal is fed from antenna 218 to a low noise amplifier 220. Amplifier 220 comprises filter circuitry which passes the desired signal information and filters out noise and unwanted signals at frequencies outside the pass band of the filter circuitry. A downconverter 222 downconverts the signal at the carrier frequency to an intermediate frequency or to base band. Again, this is accomplished based on the abovementioned trigonometric identity by multiplying the received signal times a sinusoid to obtain a difference frequency. Filtering accepts the signal at the difference frequency and rejects the signal at the sum frequency. Persons of ordinary skill in the art will recognize implementations of more than one stage of downconversion. By shifting the received signal to a lower frequency or to baseband, the function of demodulation is easier to perform.

Demodulator 224 demodulates the received signal. Demodulation is the process of extracting the information content from the received downconverted signal to produce an information signal. Demodulation may occur at an intermediate frequency or at baseband. The method of demodulation depends on the method by which the information is modulated onto the received signal. Thus, for example, if the modulation is PSK, demodulation involves phase detection to convert phase information to a binary sequence. Demodulation provides to the decoder a sequence of bits of information. Decoder 226 decodes the received binary data blocks from demodulator 224 and transmits the decoded information to processor core 202.

Persons of skill in the art will recognize that a transceiver will comprise numerous additional components not shown in FIG. 2, such as a reference oscillator, a frequency divider, filtering circuitry, synchronization circuitry, possibly multiple frequency conversion stages and multiple amplification stages, etc. Embodiments achieve reduction of EMI/EMC interference that arise from high-power base band interconnect signaling, by communicating information at frequencies above existing and future interconnect signaling frequencies. Embodiments compare favorably to optical solutions which involve high costs of manufacture and integration with the non-optical circuitry in the die. Note that transmission at low power limits communications to relatively small distances such as distances within the form factor of a mobile or desktop or tower platform. For close proximity communications, high power is not necessary, thereby eliminating the need for high gain antennas.

Figure 3:
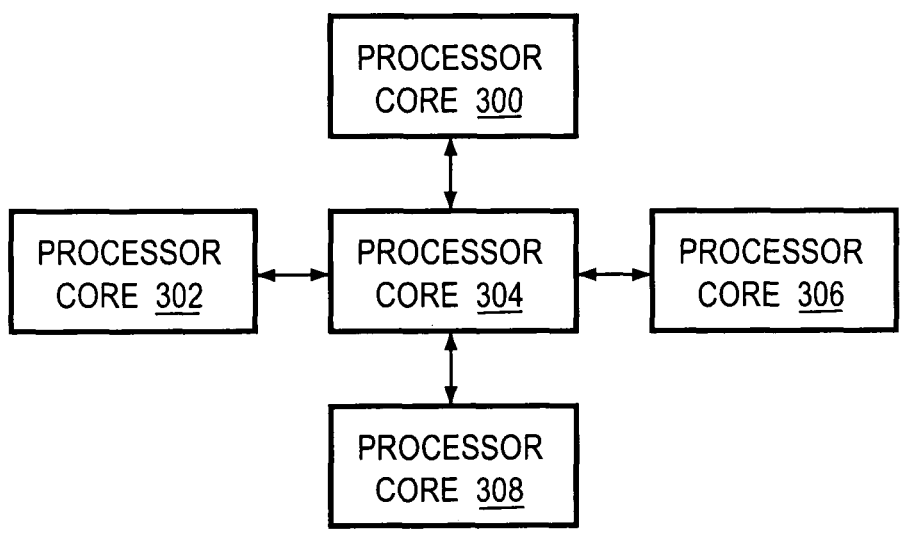
FIG. 3 depicts one embodiment of a multi-processor, multi-transceiver configuration.

FIG. 3 shows one embodiment of a multi-processor, multi-transceiver configuration. Each processor chip, 300-308, has a processor, circuitry related to the processor, and at least one transceiver. In particular, processor chip 304 may have 4 transceivers, one on each side, to transmit to and receive from four processor chips 300, 302, 306 and 308. Each processor chip can be on the same or a different circuit board. In the alternative to a processing chip with a processor, a processing chip may comprise a slave device such as a memory controller. All the units in RF communication may lie in one plane or different units may lie in different planes. Each transceiver of processor chip 304 comprises an antenna such as an array of antenna elements arranged on a side of the chip to form a directive beam toward the processor in proximity to the side. Thus, an array of antenna elements may be distributed about the periphery of each processor core to enable selective directivity.

Figure 3A:
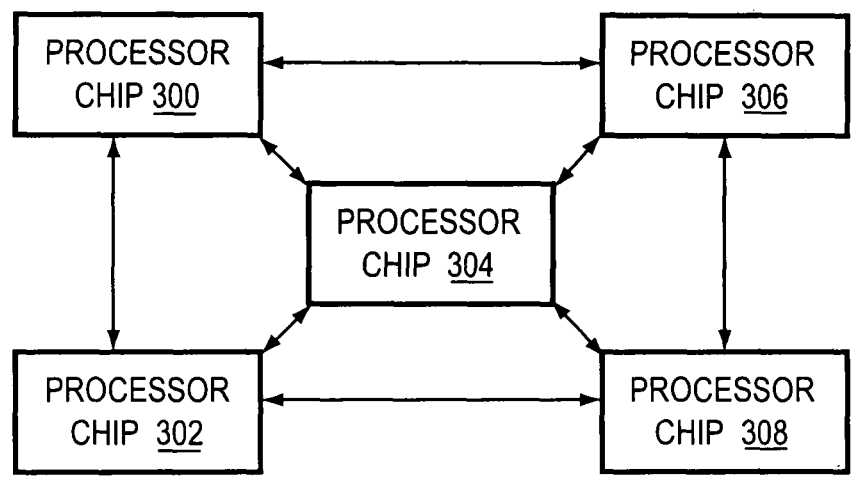
FIG. 3A depicts another embodiment of a multi-processor, multi-transceiver configuration.

FIG. 3A shows another multi-processor, multi-transceiver configuration. In this configuration, processor chips 300, 302, 306 and 308 are on the corners of a processor chip 304. Antenna elements may be arrayed on each corner of a processor chip with the processor core in the center. In one embodiment, one transceiver may drive more than one antenna, with a switching mechanism to control which antenna is driven. Other orientations and transceiver/antenna configurations can readily be implemented given the disclosure herein. In an embodiment, any one processor chip may communicate with one, some, or all of the other chips.

FIG. 3 and FIG. 3A show that multiple processors can be combined on a circuit board more densely than is possible with wire line busses. In order for a plurality of processors to be communicating at one time, a multiple access method is implemented. In one implementation, multiple processors can communicate without substantial interference by use of Code Division Multiple Access (CDMA). In CDMA, each transceiver may have associated therewith one pseudo-random code out of a set of orthogonal pseudo-random codes. Each code in the set is a unique binary sequence. Each code, $x^k$, in the set is said to be orthogonal to any other code, $x^l$, in the set, so that a cross-correlation between any two different codes is about zero. Thus, $$C_n(x^k, x^l) = \sum_{i=0}^{N} x^k(i+\varphi) \cdot x^l(i+n) \approx 0, \text{ for all } k \neq l, n \neq \varphi$$

where $x^k(N+m)=x^k(m)$ for $0 \leq k \leq N$, and $C_n$ is the cross correlation function. Another property of the pseudo-random codes is that a sequence's autocorrelation function is about zero, except for zero shift. Thus $$C_n(x^k, x^k) = \sum_{i=0}^{N} x^k(i) \cdot x^k(i+n) \approx 0, \text{ for all } n \neq 0$$

and $$C_0(x^k, x^k) = \sum_{i=0}^{N} x^k(i) \cdot x^k(i) \approx 1$$

Figure 4:
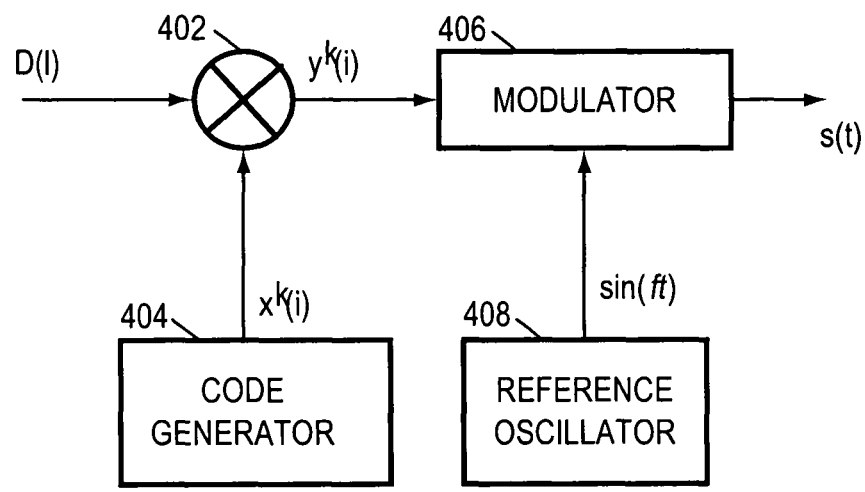
FIG. 4 depicts a pseudo-random encoder and modulator.

In a CDMA system, a signal to be transmitted is encoded with a sequentially repeating code in the set of codes. This may be done by simple multiplication of the repeating code with the signal to be transmitted. FIG. 4 shows a binary sequence of information, D(l), being mixed in a mixer 402 with a code sequence, $x^k(i)$, received from a code generator 404 to produce a spread spectrum signal:

$$y^k(i) = D(l)x^k(i)$$

Note that the binary information sequence D(l) is a sequence that in one embodiment contains redundancy introduced by encoder 208 of transmitter 206. In one embodiment, the duration of one bit in the information sequence D(l) is equal to, or is an integer multiple of, the duration of the code sequence.

The signal, $y^k(i)$, can be modulated, by, for example, Binary Phase Shift Keying (BPSK) or Minimum Shift Keying (MSK), in modulator 406, onto a frequency derived from a sinusoid that is output by a reference oscillator 408. This produces an output signal, s(t). This signal is then upconverted to the carrier frequency of the transmitter. In one embodiment, the duration of a data is an integer number times the duration of a code bit and is a larger, integer number of carrier frequency cycles. The code bit duration is also an integer number of carrier frequency cycles. Synchronization between the reference oscillator, the code sequence, and the binary information sequence can be implemented so that a cycle starts when a code bit starts, and a code bit starts when a data bit starts.

Figure 4A:
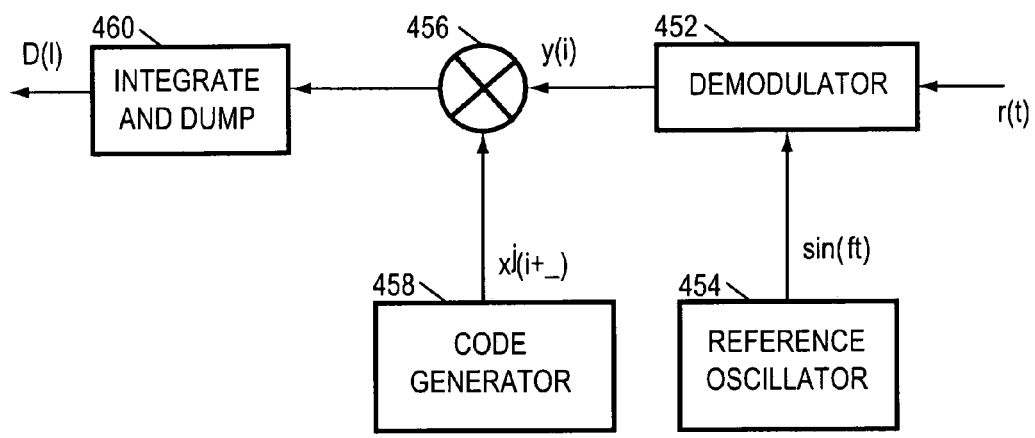
FIG. 4A depicts a demodulator and de-spreading circuitry for extracting information from a spread spectrum signal.

FIG. 4A shows part of a receiver for receiving and decoding a spread spectrum signal as described above. The received signal is demodulated by a demodulator 452 using the sinusoid from the reference oscillator 454, to produce a signal, y(i), that is a superposition of all signals transmitted and may be represented as:

$$y(i) = \sum_{k=0}^{S} D_k(l + \theta_k) x^k(i + \theta_k) + c(t)$$

where $D_k$ is the data sequence encoded by $x^k$, $c(t)$ is noise and error, and $\theta_k$ denotes a delay that may be different for each transmitted signal. The receiver may correlate the signal $y(i)$ with any one of the codes $x^j(i+\phi)$ that can be generated by code generator 458, where $\phi$ is a phase that can be adjusted to effectuate phase tracking. This yields:

$$C(x^j, y) = \sum_{i=0}^{N} y(i) x^j(i + \varphi) =$$

$$\sum_{k=0}^{N} D_k(l + n_k) \sum_{i=0}^{N} x^j(i + \varphi) x^k(i + n_k) \approx \begin{cases} 0 \text{ for } j \neq k \text{ or } \varphi \neq n_k \\ D_k(l + \varphi) \text{ for } j = k \text{ and } \varphi \approx n_k \end{cases}$$

where the noise contribution is suppressed for clarity. The product, $y(i)x^j(i+\phi)$ is formed in a mixer 456. The summation over i is performed by an integration and dump circuit 460. The rightmost summation over i is the correlation process described above, which is substantially zero, except when j=k and $n_k=\phi$. When j=k and $n_k=\phi$, the correlation of y(i) and $x^j{}_\phi$ produces the information data sequence, $D_k(l)$. Thus, by correlating the incoming signal with $x^j{}_\phi$, the data sequence of a single particular signal is extracted.

An embodiment of a receiver employs code phase detection. Thus, the quantity $\phi$ may be adjusted to maximize the signal $C(x^j,y)$. This will occur when $\phi=n_k$. In addition, or in the alternative, the receiver may implement early and/or late code phase tracking. In an implementation, therefore, one may perform an early and a late correlation, where for the early correlation $\phi=n_k-\Delta$, and for the late correlation $\phi=n_k+\Delta$, where $\Delta$ may be less than a code bit width. In this embodiment, the peak correlation lies between the early and late correlations.

So, in one embodiment, when a first transceiver transmits to a second transceiver, the first transceiver will encode the transmitted signal with a code associated with the second receiver. The second transceiver will correlate the received signal with the code with which it is associated. Because the codes in the set are orthogonal, only the information, D(l), encoded with the second transceiver's code will emerge from the correlation process. Other signals encoded with the code of a different transceiver will be rejected by the correlation process of the second transceiver.

In another embodiment, each transmitter transmits a signal encoded with one of the codes of the set of codes, where the code is associated with the transmitter. In this embodiment, each receiver in the multi-transceiver system can decode the signal from any one of the signals transmitted by a plurality of transceivers. Thus, referring again to FIG. 3, a first receiver of processor chip 304 may receive a signal $D_k(l)x^k(i)$ from a first processor 302 and may receive in a subsequent time interval, or by a separate receiver, the signal $D_j(l+n_j)x^j(i+n_j)$ from a second processor 306. In one embodiment, therefore, a correlation can be performed by the receiver between the received signal and a locally generated signal $x^k$ in a first time interval to produce the sequence $D_k(l)$, and a correlation can be performed by the receiver between the received signal and a locally generated signal $x^j$ in a second time interval to produce the sequence $D_j(l)$.

In another embodiment, multiple correlations can be performed simultaneously, each one involving a different code in a sequence. Thus, a transceiver can simultaneously monitor the transmissions of multiple transmitters, each transmitter transmitting a signal on a different code. When a transmitter transmits a signal, it may tag the signal with the identity of the intended receiver. Therefore, when a receiver decodes a signal of a transmitter, the receiver checks the identification tag of the signal to see if the signal is intended for it.

Note that any given processor chip in a multi-processor, multi-transceiver system may be programmed to communicate with only one, or some, or all of the other processors and slave devices in the system. Thus, a hierarchy of communications may be established between the processors and slave devices. In one embodiment, for example, one processor operates as a central processor for coordinating communications between subordinate processors. In a Time Division Multiple Access (TDMA) scheme, the central processor assigns time slots to the subordinate processors and controls communication between the processors. Thus, referring again to FIG. 3, processor chip 304 may comprise the central processor in a system with subordinate processor chips 300, 302, 306, and 308. Each subordinate processor chip may be assigned by the central processor to a different time slot within which to communicate with the central processor.

Thus, the central processor may receive data from processor chip 302 intended for processor chip 306 in one time slot, and then transfer the received data to processor chip 306 in a subsequent time slot. In this scheme, the multi-processor, multi-transceiver system is somewhat analogous to a mobile communications system with multiple mobile phone subscribers communicating with each other by way of RF link to a base station. But further, the central processor may perform the functions of a processor local bus. Thus, the central processor may handle the order in which data is communicated, and may also, for example, process snoop requests. All without space devoted to a multi-processor wire line bus system.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. An integrated circuit for coupling a personal computer processor to a memory controller wirelessly within a housing of the personal computer without bus lines linking the personal computer processor to the memory controller, comprising:

in the housing of the personal computer, a first die package comprising a first computer processor adapted for use in a personal computer and a first transceiver so that the computer processor and the first transceiver are in the same integrated circuit;

a modulator in the first transceiver to modulate data from the first computer processor to produce a first modulated signal;

a plurality of antennas distributed about the periphery of the first die, switchably connectable to the first transceiver to yield directivity in a plurality of selectable directions, the antennas to radiate the first modulated signal from the first transceiver to, and to receive a second modulated signal from, a second transceiver in a second die package comprising the memory controller, wherein the second transceiver is in the same housing as the first transceiver, and a demodulator in the first transceiver to demodulate the second modulated signal from the second transceiver.

2. The integrated circuit of claim 1, further comprising an encoder in the first transceiver to encode data from the first processor and a decoder in the first transceiver to decode data from the second transceiver.

3. The integrated circuit of claim 1, wherein the antennas are embodied on a printed circuit board that holds the die comprising the computer processor and the first transceiver.

4. The integrated circuit of claim 3, wherein the antennas operate in a millimeter wavelength band.

5. The integrated circuit of claim 1, wherein the first computer processor is connected to a plurality of transceivers, each transceiver capable of transmitting in a different direction toward a different transceiver.

6. The integrated circuit of claim 1, wherein data from the first computer processor is impressed with a pseudo-random code.

7. A computer system within a housing using wireless communications to connect a computer processor to a network adapter in the system, comprising:

a first transceiver and a first computer processor integrated together on a first die and a second transceiver and a network adapter integrated together on a second die; the first transceiver to generate a modulated signal comprising data from the first computer processor, and the second transceiver to receive the modulated signal and to recover from the modulated signal the data from the first computer processor and send the data to the network adapter; and a plurality of individually selectable, highly directive antennas disposed about the periphery of the die of the first computer and coupled to the first transceiver, to generate an electromagnetic wave comprising the modulated signal from the first transceiver, and at least one antenna embodied on a printed circuit board and coupled to the second transceiver, to receive at the second transceiver a portion of the electromagnetic wave comprising the modulated signal from the first transceiver.

8. The system of claim 7, wherein at least one of the antennas comprises a plurality of antenna elements to form a directive beam.

9. The system of claim 8, wherein the beam is directive in an electronically selective direction.

10. The system of claim 7, wherein the antennas are millimeter wave antennas.

11. The system of claim 7, wherein a signal radiated by an antenna coupled to the first transceiver is a spread spectrum signal.

12. The system of claim 11, wherein the spread spectrum signal is impressed with a pseudo random noise code.

13. The system of claim 7, wherein a transmission frequency of the first transceiver is in the frequency band from about 30 GHz to about 300 GHz.

14. The system of claim 7, wherein an antenna coupled to the first transceiver is embodied on the same die as the first transceiver.

15. The system of claim 7, wherein the antenna coupled to the first transceiver comprises a micro-strip printed on the printed circuit board.

16. The system of claim 7, wherein the first computer processor is a central processor to facilitate communications between other computer processors.

17. A method for transferring information between a computer processor and a memory controller installed within a housing of a computer system, comprising:

modulating via a first die, data from the computer processor with a first transceiver, wherein the first computer processor and the first transceiver are integrated into the first die;

selecting one of a plurality of antennas switchably connectable to the first transceiver and located about the periphery of the first die, the one selected being in closest proximity within the housing to a second transceiver integrated with a memory controller, radiating the data in a modulated signal from the selected antenna coupled with the first transceiver;

receiving the modulated signal with a second antenna coupled with the second transceiver; and demodulating the modulated signal in the second transceiver to transmit the data to the memory controller, wherein the second computer processor and the second transceiver are integrated into a second die.

18. The method of claim 17, further comprising encoding the data from the first computer processor in the first transceiver and decoding the data from the first computer processor in the second transceiver.

19. The method of claim 17, wherein an antenna of said antennas is embodied on a printed circuit board holding a die containing a transceiver and a processor.

20. The method of claim 17, wherein both processors and both transceivers are on the same die.

21. The integrated circuit of claim 1, wherein the first computer processor comprises an comprise an instruction decoder and an instruction buffer.

22. The computer system of claim 7, wherein the first computer processor with the housing comprises a dispatch unit and register files.

23. The computer system of claim 7, wherein the network adapter is coupled to a network, wherein further the network comprises a plurality of computers, and a plurality of peripheral devices.

* * * * *